Figure 1:
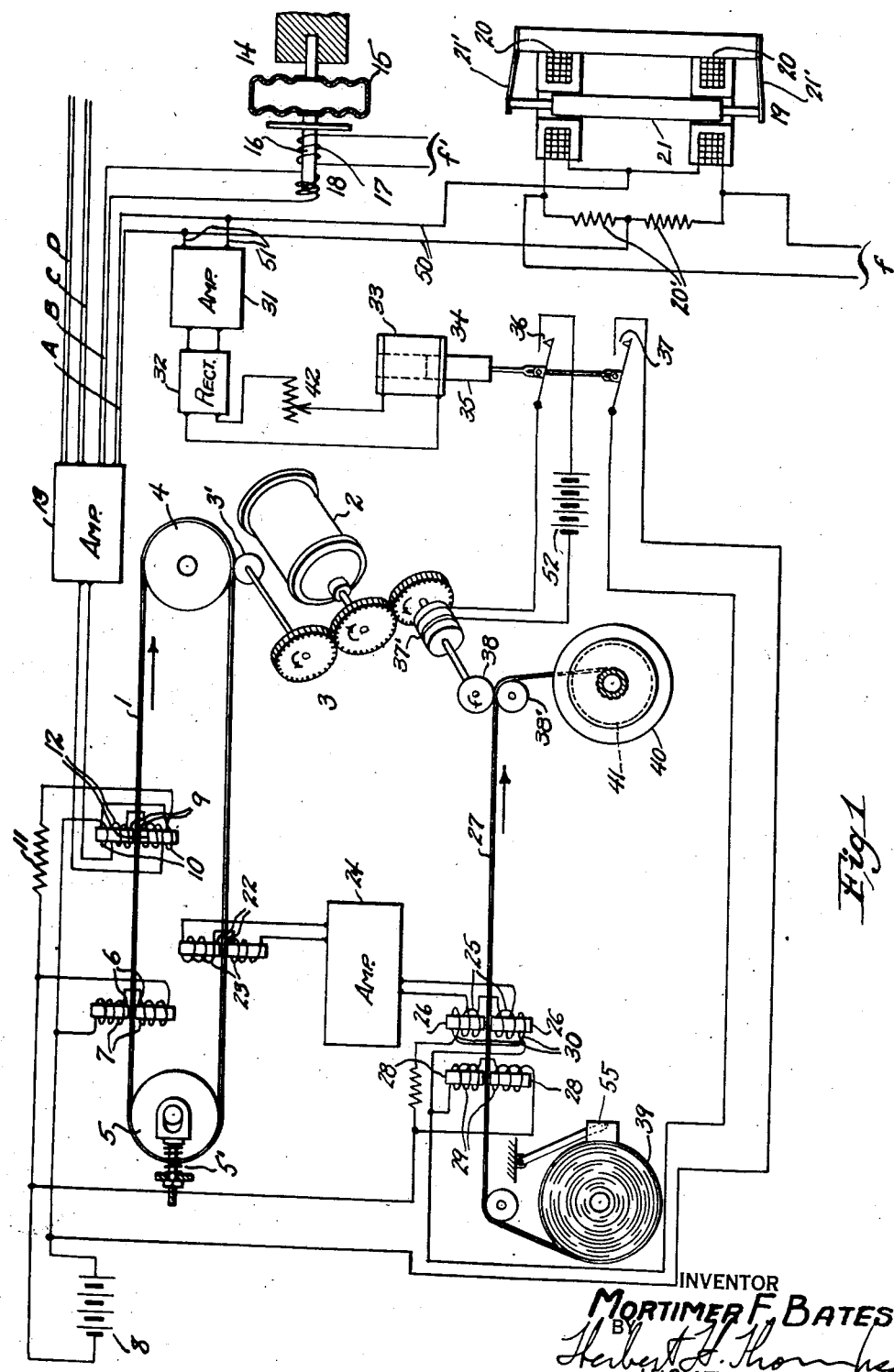

Oct. 13, 1942.  M. F. BATES  2,298,608
MEMORY TYPE RECORDER
Filed Nov. 7, 1939

INVENTOR
Mortimer F. Bates
BY Herbert H. Thompson
HIS ATTORNEY

Patented Oct. 13, 1942

2,298,608

UNITED STATES PATENT OFFICE 2,298,608

MEMORY TYPE RECORDER

Mortimer F. Bates, Brooklyn, N. Y., assignor to Sperry Gyroscope Company, Inc., Brooklyn, N. Y., a corporation of New York Application November 7, 1939, Serial No. 303,332

1 Claim. (Cl. 234—1.5)

This invention relates to recorders and it refers to a type of recorder adapted to make a continuous but temporary record of the variations of one or more quantities and to translate portions of that record into a permanent form upon the occurrence of selected events. The continuously registered temporary record makes available the past history of an event covering an interval corresponding to the duration of the temporary record. A recorder of this type may serve as a "memory" device which is used to "recall," at the instant a selected event occurs, changes immediately preceding that instant and to preserve a permanent record thereof for subsequent examination.

A recorder with a "memory" for past events is useful in studying the variations of significant physical quantities not only after but before an event whose occurrence may take place without warning and at unknown intervals, without having to obtain a permanent record over a long period of time, the greater part of which record would be valueless.

One important application of my recorder is in the study of conditions affecting the flight of aircraft. For instance, it is well known that at times an unusual combination of factors may subject an aircraft to abnormally high acceleration with accompanying high and possibly dangerous stresses in the structure. A comprehensive study of the conditions leading up to such abnormal acceleration may require observations extending over several months, during which period the significant event, i. e., acceleration exceeding a predetermined value, may occur only a few times and the total duration of all such events be only a few minutes. Obviously, it would be uneconomical and in many cases impossible to make and store a record covering the entire observation period. For such a study my apparatus would be arranged to make a continuous temporary record of the quantities which are of interest and upon the occurrence of acceleration exceeding the critical value to transcribe the record automatically from the temporary to a permanent medium.

It will be evident that in carrying out my invention many types of recording media may be used, the requisite conditions being that the medium selected shall be capable of holding an impressed record for at least the interval of the desired history and that this record may be erased or shall disappear automatically without affecting the usefulness of the medium for subsequent recording. As an example of one medium meeting these specifications there may be mentioned certain minerals having the property of luminescence which retain a pattern impressed upon them by a light source for a limited time.

A preferred medium for carrying out the purposes of my invention, however, is magnetically permeable material such as iron or steel of a type which is capable of retaining a magnetic pattern after the magnetizing force producing the pattern ceases to act, which pattern may be erased by the application of a strong erasing field. Such magnetic material is commonly used in the form of a thin tape or ribbon and a description of the principle of recording on magnetic tape has been given in an article by C. M. Hickman in the Bell System Technical Journal for April, 1937. Particular reference is made to the section of this article commencing on page 171, headed "Method of recording with perpendicular magnetization." In a recording system operating on the principle described, data to be recorded are transformed into alternating electric currents which generate magnetic fields intercepting the tape and cause corresponding magnetic patterns to be impressed upon and retained by the tape which is prepared for accurately recording wide signal variations by being given a suitable magnetic bias. Erasure of the record is accomplished by applying a magnetic field strong enough to saturate the tape magnetically and obliterate any residual or previously recorded pattern.

By making use of a continuous loop of tape in such a system, data may be continuously recorded as the tape passes one set of magnetizing pole pieces and erased by pole pieces further along in the direction of travel, the same loop being used over and over again without deterioration. Reproduction is accomplished by causing the magnetic pattern on the tape to generate an E. M. F. proportional thereto, which E. M. F. is employed to actuate any desired type of electrical reproducer or to energize a second set of recording pole pieces to rerecord on a second tape.

One object of my invention is to provide means whereby a selected event controls the recording of other events preceding its occurrence.

Another object is to provide a recorder in which a temporary record is continuously made and erased and which has means for automatically reproducing portions of the temporary record in permanent form.

A further object is to provide a recorder which automatically selects and records histories of predetermined significant events.

Referring to the drawing a schematic diagram is shown illustrating a preferred form of my invention in which a continuous loop of permeable tape is used for making a temporary record and in which a second permeable tape is used for making a permanent record.

As one form which my invention may take, a multi-channel recording system is illustrated in which a plurality of quantities are recorded at the same time. This may be accomplished by the use of alternating currents of different frequencies on the several channels, the use of different channel frequencies making it possible after recording to separate the information carried by the several channels by well known filter means which are not shown since the present invention is not concerned with analyzing the recorded data.

Numeral 1 refers to a tape or ribbon of permeable material in the form of a continuous loop. Tape 1 is continuously driven by a motor 2 through gearing 3 and friction wheel 3', which engages the tape as it passes over drum 4. The tape is under constant tension applied by spring tension device 5' acting on idler drum 5. The direction of travel of the tape is indicated by an arrow.

Erasing pole pieces 6 between which the tape passes are supplied with split winding 7 connected to battery 8 for producing a magnetic field transverse to the surface strong enough to magnetically saturate the tape and obliterate magnetic patterns existing therein. Recording pole pieces 9 are supplied with two split windings. One winding 10 is connected to battery 8 through resistance 11 and produces a biasing field, while the other winding 12 is connected to the output of signal amplifier 13 and generates a field proportional to the output of this amplifier. Amplifier 13 may be of a conventional type having means for combining several signals and producing an amplified composite output.

The pick-ups for translating the quantities to be recorded into electrical impulses are connected to the input of amplifier 13. Four channels A, B, C, D, are shown with pick-ups associated with channels A and B only. Each pick-off is shown as modulating an alternating carrier current, the frequency of that supplied to channel A being designated by $f$, while that supplied to channel B is designated by $f'$.

A pick-up suitable for obtaining a signal proportional to acceleration is shown at 19, which may be of the type disclosed in the pending application of R. K. Bonell, Serial No. 160,949, now Patent No. 2,210,970. This accelerometer is excited by alternating current supplied to a bridge circuit of which the two windings 20 form two arms. The other two arms of the bridge are shown as resistances 20'. A bar of permeable material 21 supported by leaf springs 21' is displaceable with respect to coils 20 under the influence of acceleration along its axis and differentially changes the impedance of said coils, thereby producing an output voltage at carrier frequency across bridge points of the circuit whose magnitude is proportional to acceleration.

A type of pick-up for translating variations of atmospheric pressure into electrical impulses is shown at 14 and consists of a manometric capsule 15, one face of which is rigidly supported by the housing of the instrument and the other face of which is free to deflect with change of atmospheric pressure and in deflecting displace a bar 16 of permeable material relative to a coil 18. Bar 16 is supplied with an exciting winding 17 and partially projects into coil 18 so that a displacement of the end of the bar varies the mutual inductance between the coils, thus varying the voltage induced in coil 18.

For reproducing in electrical form the transient record on tape 1, reproducing pole pieces 22 are supplied with split winding 23 capable of having induced in it alternating E. M. F.'s as the changing magnetic pattern of the tape passes between the poles. Said winding is connected to amplifier 24 of conventional type, the output of which energizes split recording winding 25 on recording pole pieces 26, which are also provided with a split biasing winding 30. The functions of these windings are the same as those of the corresponding windings on pole pieces 9.

Pole pieces 26 produce a magnetic record on magazine tape 27. In order to obliterate any residual magnetic pattern in this tape it is first magnetized to saturation by erasing pole pieces 28, having split winding 29 capable of being connected to battery 8. Normally tape 27 is stationary and the connections between battery 8 and windings 29 and 30 are broken at contact 37 of relay 34.

In the system illustrated in the drawing, the transfer of the transient record from tape 1 to magazine tape 27 is conditional upon the occurrence of an acceleration exceeding a predetermined value. Across leads 50 connected to accelerometer 19 there are bridged leads 51 connected to the input of amplifier 31 of conventional design. When the aircraft is not subjected to acceleration the accelerometer bridge circuit is balanced and no input occurs to amplifier 31. Under acceleration, however, the bridge is unbalanced and a voltage appears across the input of amplifier 31 proportional to acceleration and the resulting output of the amplifier after being rectified by rectifier 32 is supplied to winding 33 of the operating solenoid of relay 34. The strength of the current supplied to winding 33 is adjustable by means of rheostat 42. When this current exceeds a predetermined value plunger 35 is moved upwardly within the solenoid, closing contacts 36 and 37. The closure of contact 37 energizes erasing winding 29 and biasing winding 30 from battery 8 while the closure of contact 36 energizes magnetic clutch 37, one of whose members is connected through gearing to motor 2 and the other member to friction drive wheel 38, which is in frictional engagement with tape 27 as it passes over idler roll 38' and thereby causes said tape to move in the direction of the arrow. Tape 27 unwinds from supply reel 39 and is rewound on storage reel 40 while being kept under constant tension by spiral spring 41 acting on the latter reel and brake 55 acting on reel 39.

The operation of my device is as follows: Assuming for the purpose of illustration that it is desired to record, on an aircraft, the variations of certain quantities immediately preceding and during the occurrence of acceleration which exceeds a predetermined value, rheostat 42 is adjusted so that the current of the amplified and rectified signal from accelerometer 19 at the occurrence of the critical acceleration is just sufficient to cause plunger 35 to be attracted within solenoid 33 and thereby close contacts 36 and 37.

Tape 1 is being continuously driven by motor 2 and erasing pole pieces 6 apply a constant magnetic field strong enough to obliterate any residual magnetism. After receiving this strong initial magnetization the tape passes outside of the saturating field and the magnetization drops off slightly before recording pole pieces 9 are reached. Here, a biasing field is applied by biasing winding 10 which adjusts the magnetization to a linear portion of the magnetization curve and thereby puts the tape in a condition to receive the signal field applied by recording winding 12 and record the widest possible amplitude of signal variation without distortion. After passage beyond recording pole pieces 9 the tape retains as a magnetic pattern the signal which has been impressed upon it. This signal as previously noted may be a composite one and is shown in the diagram as being made up of signals of four different frequencies from four different channels, one of which is used for recording barometric pressure and another of which is used for recording acceleration. Obviously, any other significant quantities may be recorded, and my invention is not limited as to the recorded quantities, the number of channels employed or the event which initiates the making of the permanent record.

In the system illustrated, at the instant acceleration exceeds the predetermined critical value, solenoid 34 is operated by the amplified and rectified acceleration signal and closes contact 36 thereby energizing magnetic clutch 37 from battery 52. The operation of clutch 37 causes magazine tape 27 to be driven by friction roller 38 and thereby to unwind from reel 39 and to be rewound on reel 40. Contact 37, also closed by the operation of solenoid 34, connects winding 29 on erasing pole pieces 28 to battery 8 and connects biasing winding 30 on recording pole pieces 26 to the same battery through a resistance. The passage of the magnetic pattern on tape 1 beneath reproducing pole pieces 22 generates an E. M. F. in the windings of coil 23 which is amplified by amplifier 24 and supplied to recording windings 25. The preparation of the tape and the recording is similar in the case of tape 27 to the corresponding processes described in connection with tape 1. Reproducing pole pieces 22 are placed at some distance in the direction of tape travel from recording pole pieces 9 and the interval taken by the tape to travel from recording to the reproducing pole pieces is the interval whose history can be transferred to magazine tape 27.

Winding 33 remains energized so long as the acceleration exceeds the critical value determined by the setting of rheostat 42 and thereby continues the transfer of the record to magazine tape 27 until the acceleration drops to a value which de-energizes the solenoid, opens contacts 36 and 37 and stops permanent recording. The energization of winding 33 may be maintained during the entire interval in which permanent recording is desired by setting rheostat 42 to a value of acceleration not necessarily the exact critical value whose recorded history is desired but one which will be exceeded for at least the desired interval. It is evident, therefore, that without any attention on the part of an operator such a recorder will select significant events to which it is adjusted, and under the described conditions record a history of whatever quantities the pickups connected to the various channels are responsive to, and continue to record the variations in these quantities for an interval corresponding to the duration of the event.

The recording of variations of physical quantities in the study of aircraft performance has been described as illustrative only of one application of my recorder. Obviously, there are many other applications of a recorder of the type described and many quantities that can be recorded other than those described in the illustrative case.

Likewise, as many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

Apparatus for obtaining a record of variations of a physical quantity preceding a selected event, comprising a recording medium in the form of a continuous loop capable of retaining a record, means for continuously rotating said loop, recording means for recording a signal corresponding to said variations on said loop, erasing means for erasing said record displaced from said recording means along said loop in the direction of travel thereof, electromagnetic reproducing means intermediate said recording and erasing means for reproducing as a varying electromotive force portions of said record corresponding to variations of said quantity occurring prior to variations being simultaneously initially recorded, a second recording medium, continuously operating driving means for said second recording medium, a normally disengaged clutch connecting said driving means and said second medium, electromagnetic recording means for making a record on said second medium corresponding to said electromotive force, means for normally disconnecting said recording means from said reproducing means, and adjustable means for energizing said clutch and connecting said reproducing means to said second recording means operative simultaneously with the recording of a predetermined event upon said loop to produce a record of said electromotive force on said second medium corresponding to signals preceding said predetermined event.

MORTIMER F. BATES.